UNITED STATES PATENT OFFICE.

FREDERICK AUGUSTUS WENDEROTH, OF PHILADELPHIA, PENNSYLVANIA.

IMPROVEMENT IN PHOTOGRAPHY.

Specification forming part of Letters Patent No. 120,136, dated October 17, 1871.

*To all whom it may concern:*

Be it known that I, FREDERICK AUGUSTUS WENDEROTH, of Philadelphia, county of Philadelphia, State of Pennsylvania, have invented Improvement in Sealed Carbon Photograph and process of making the same, of which the following is a specification:

My invention consists of a brilliant photographic picture, the light or lightest parts of which are produced by the exposure of the plate or plated surface on which the picture is made in a manner too fully explained hereafter to need preliminary description, glass being securely sealed to the face of the picture to insure permanency.

My improved picture has two prominent peculiarities: first, brilliancy of its lights; and, second, its indestructibility. The brilliancy is brought about by so making the picture on a metal plate that the surface of the plate is exposed to produce the lights of the picture, a plan opposite to that heretofore practiced in all photographic pictures heretofore made on metal plates, such as daguerreotypes, ambrotypes, or iron types, in which the shadows are produced by uncovering the surface of the plate. The permanent quality of my improved picture is insured by the peculiar manner, described hereafter of sealing a plate of glass to the pictured surface of the plate. As regards the selection of plates wherewith to carry out my invention, I prefer one of Brittania metal or other white alloy, with a silver-plated surface; but a plate of other metals or alloys, or any material with a plated surface will serve the purpose. There are several methods of making the picture on the plate; but I prefer that which I will now describe, as practiced by me with success. Having obtained a glass negative similar to that required for an ordinary photograph, I coat a piece of paper with gelatine, with which has been mixed the desired coloring-matter, lamp or ivory-black, for instance, a proper quantity of bichromate of potash having also been mixed with the gelatine to render the latter sensitive to light. When the gelatine is dry, I cut from the sheet of prepared paper a piece of the size of the required picture, and expose it under the negative either to the direct rays of the sun or to diffused light, for a proper length of time, after which the piece of gelatinized paper is moistened and applied and caused to adhere to the surface of a plate, which is then immersed in water at a temperature of from 90° to 100° Fahrenheit. After the application of a few minutes to this bath the paper will be detached from the gelatine, and the parts of the latter unaffected by light will be dissolved, leaving on the plate a picture the shades of which consist of the colored gelatine, and the lights, or rather the lighter portion of which consist of the exposed surface of the plate. I may remark here, that on applying the gelatinized paper to the surface of the plate, air-bubbles will sometimes occur to the detriment of the picture. I have found that this can be effectually obviated by moistening the paper in a solution consisting of alcohol and water in about the proportion of one ounce of the former to eight of the latter. To render the picture thus produced permanent, I seal to the surface a piece of plate glass in the following manner: I place the plate face uppermost on a suitable stand, above a small stove or lamp, so as to impart sufficient heat to the plate to melt the white beeswax, which I have found to be the most effective sealing-medium. The glass should also be similarly heated. The wax can be applied to the plate in such small quantities that when melted it will spread over the surface in a very thin film, after which the glass may be applied, a suitable weight placed on it, and the stove or lamp removed. After the plate and glass have become cool they will be effectually sealed, the sealing-medium being imperceptible and free from all air-bubbles.

I have given above what I consider to be by far the best mode of making the picture on the plate, in the first instance; but I will give, in the brief terms which will suffice for the understanding of intelligent photographers, two other plans of making the picture on the plate. First, I take a collodion positive on glass by the wet or dry process, and when toned, float the film off the glass onto the metal plate, and then seal the picture to glass as before. Second, I protect the metal plate by a coating of proper varnish, and then take a collodion positive on it by the wet process in the camera, or by the collodion chloride process under a negative, and then seal the picture.

An important feature of my invention is the preparation of the surface of the plates. While brilliant effects may be produced with plates having the ordinary smooth polish, I have found that a much more decisive and otherwise better effect can be produced by making throughout the surface almost imperceptible grooves and ribs. This I accomplish in the following manner: The surface of the plate having been smoothly polished, I take very fine sand, and with a linen rag rub the plate until the desired brilliancy is attained. It is best to rub the plate up and down the picture, for I have found that if the ribs are made across the picture or diagonally, the effect is not as good as when the plate is ribbed vertically. Duplicates of portraits of uniform perfection can be produced by my invention, which was an impossibility in practicing any heretofore known plan of making photographic pictures on metal plates. If desired, the surface of the plates may be tinted with colored varnishes prior to making the pictures, and the most brilliant ornamental effects can be produced by the coloring of the plates.

I claim—

1. A carbon photographic picture made on a metal surface and sealed, all substantially as set forth.

2. The employment, for the purpose specified, of water and alcohol for moistening the gelatine prior to applying it to the plate.

3. The employment, in making a picture of a plate or plated surface ribbed substantially in the manner described.

4. The preliminary coloring of the face of the plate or plated surface, for the purpose specified.

In testimony whereof I have signed my name to this specification in the presence of two subscribing witnesses.

F. A. WENDEROTH.

Witnesses:
 WM. A. STEEL,
 JOHN K. RUPERTUS. (111)